United States Patent [19]
Zijderhand

[11] Patent Number: 5,347,521
[45] Date of Patent: Sep. 13, 1994

[54] METHOD AND ARRANGEMENT FOR DATA TRANSMISSION WITH LOAD MONITOR AND ADAPTIVE DISTRIBUTION

[75] Inventor: Frans Zijderhand, Eindhoven, Netherlands

[73] Assignee: U.S. Philips Corporation, New York, N.Y.

[21] Appl. No.: 911,236

[22] Filed: Jul. 8, 1992

[30] Foreign Application Priority Data

Jul. 8, 1991 [EP] European Pat. Off. ........... 91201764

[51] Int. Cl.⁵ .............................................. H04J 3/16
[52] U.S. Cl. ................................. 370/85.3; 370/85.7; 370/94.1; 370/95.1
[58] Field of Search .................. 370/95.1, 95.2, 95.3, 370/17, 85.2, 85.3, 85.1, 94.1, 85.15, 85.7, 85.6, 85.8, 79, 110.1; 340/825.05, 825.07, 825.5, 825.06, 825.07, 825.08, 825.13, 825.54, 825.52

[56] References Cited

U.S. PATENT DOCUMENTS

| | | | |
|---|---|---|---|
| 4,256,926 | 3/1981 | Goode | 370/95.3 |
| 4,322,845 | 3/1982 | Fennel, Jr. et al. | 370/95.3 |
| 4,679,187 | 7/1987 | Irvin | 370/17 |
| 4,870,408 | 9/1989 | Zdunek et al. | 370/95.1 |
| 4,912,703 | 3/1990 | Sumida | 370/95.1 |
| 4,926,421 | 5/1990 | Kuwano et al. | 370/95.1 |
| 5,179,549 | 1/1993 | Joos et al. | 370/84 |
| 5,199,027 | 3/1993 | Barri | 370/95.1 |

*Primary Examiner*—Benedict V. Safourek
*Assistant Examiner*—Ajit Patel
*Attorney, Agent, or Firm*—Jack D. Slobod

[57] ABSTRACT

In a method of data transmission from a plurality of sub-stations to a main station over a common channel which is subdivided into time slots whose length and synchronization are determined by a corresponding time slot distribution of a data transmission signal sent out by the main station, in which each sub-station in each time slot has a predetermined probability p of transmitting a data packet, the throughput of the communication channel is improved in that the probability p is adapted to the load of the communication channel.

9 Claims, 3 Drawing Sheets

METHOD AND ARRANGEMENT FOR DATA TRANSMISSION WITH LOAD MONITOR AND ADAPTIVE DISTRIBUTION

BACKGROUND OF THE INVENTION

1. Field of the Invention

The invention relates to a method of transmitting data from a plurality of sub-stations to a main station by way of a common channel which is subdivided into time slots the length and synchronization of which being determined by a corresponding time slot distribution of a data transmission signal transmitted by the main station, each sub-station having in each time slot a predetermined probability p to transmit a data packet.

2. Description of the Related Art

A method of this type is known by the name of slotted ALOHA and is described, for example, in the book entitled "Computer Networks" by Andrew S. Tanenbaum, Prentice/Hall International Editions, Chapter 6, p. 253 ff. With this known method a sub-station sends a data packet which has a time length essentially corresponding to the time length of a time slot in a basically random time slot to the main station. Such a communication link to the main station will henceforth be referenced uplink. There is also a communication link from the main station to the substations, which will henceforth be referenced downlink. The carrier frequency used for the downlink differs from the carrier frequency used for the uplink and is continuously monitored by all the active sub-stations. According to the known method the signal received by the main station is amplified and retransmitted, while the retransmitted signal may be received by all the active sub-stations, but is basically intended for only one specific sub-station. The transmitting sub-station too receives the data packet retransmitted by the main station and compares the data packet with its previously transmitted data packet. On the basis of the result of this comparison the sub-station determines whether the previously transmitted data packet has correctly been received and retransmitted by the main station, in which case a new data packet is transmitted, or transmission is stopped if no new data packet is present, or if an error situation occurs in which case the previously transmitted data packet is retransmitted.

A next transmission of a data packet, whether this is again the already transmitted data packet or a new data packet, is effected in a random time slot relative to the previously used time slot, the distance in time between the previously used time slot and the new time slot depending on said probability p.

The most important cause of an error situation is the concurrent transmission by two or more sub-stations. The data packet transmitted by the main station is then a combination of the two data packets received concurrently by the main station, and thus corresponds neither to the one nor to the other data packet, so that both sub-stations are to transmit their data packets once again. It will be obvious that the probability of such a data packet "collision" increases as the sub-stations transmit data packets more intensively, which causes a reduction of the user efficiency (denoted by the term throughput and expressed in the number of data bits received correctly per second via a communication channel divided by the maximum number of data bits that can be transmitted per second via that communication channel) of the communication channel. On the other hand, it will be obvious that when the sub-stations transmit less intensively, the probability or-"colliding" data packets will be lower, it is true, but a reduction of the throughput of the communication channel may then occur as a result of reduced channel employment. The communication channel therefore has an optimum transmit load with a maximum throughput of about 37% (cf. for example, page 256 of above-mentioned publication).

The throughput in practice of the communication channel will generally be lower than this maximum. An important reason for this is that with the known method the probability p is to be relatively small in order to ensure that the system is not "clogged" by messages to be transmitted even in the statistically improbable but not impossible case of the load of the communication channel being temporarily much larger than the average load.

SUMMARY OF THE INVENTION

It is an object of the invention to improve the known method in general.

It is a further object of the invention to improve the known method, so that the communication channel throughput occurring in practice is increased and is, in essence, equal to the maximum throughput.

For this purpose, the method according to the invention is characterized, in that the main station monitors the load of the communication channel and compares this load with an optimum load and, on the basis of the result of this comparison, transmits control instructions to the sub-stations for modifying said probability p in response to the load of the communication channel, and in that each sub-station accordingly modifies the probability p in response to receiving said control instructions.

BRIEF DESCRIPTION OF THE DRAWING

Further aspects and advantages of the invention will be clarified by the following description of a preferred embodiment of the method according to the invention, while reference is made to the drawing Figures, in which.

DETAILED DESCRIPTION OF THE PREFERRED EMBODIMENT

Figure 1:
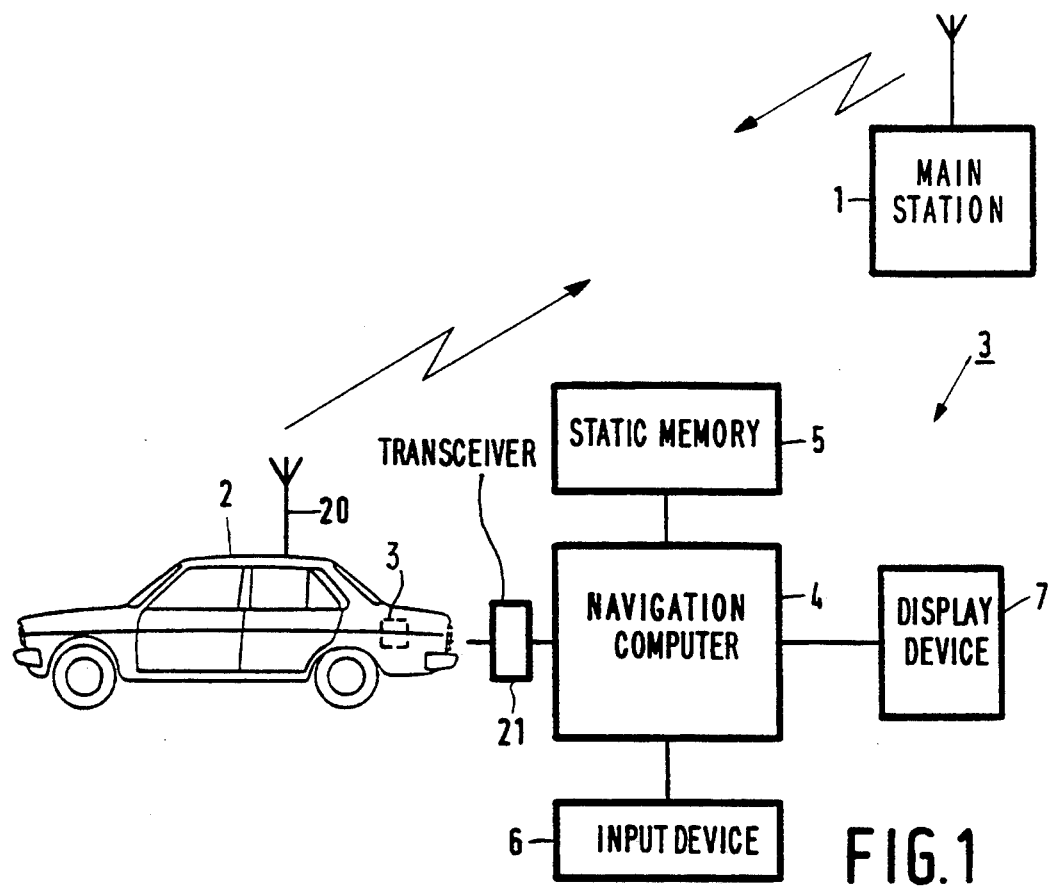
FIG. 1 shows a block diagram of a main station and a sub-station.

The invention is pre-eminently suitable for use in a traffic navigation system known per se and will therefore be discussed hereinafter by way of illustrative example in conjunction with a traffic navigation system in which a main station 1 continuously sends out navigation information for a plurality of vehicles 2 located in a coverage area of the main station 1, no more than a single vehicle being represented in FIG. 1, and the vehicles comprising each a sub-station 3 with a navigation computer 4. The navigation computer 4 which is represented outside the vehicle 2 for clarity in FIG. 1 but is generally naturally on board the vehicle 2, comprises a static memory 5, for example a CD ROM, in which basic data are stored relating to the road system in at least said coverage area. Furthermore, the navigation computer 4 comprises an input element 6, for example a keyboard, by which a user may input data relating to, for example, his point of departure and his destination. On the basis of, for example, the point of departure, the destination and the basic data of the road system stored in the memory 5, the navigation computer 4 computes the route to be followed and informs the user of this route via a display device 7. The display device 7 may comprise, for example, a picture screen and/or a loudspeaker through which instructions may be given to the user.

Auxiliary information is transmitted by the main station 1 by way of the downlink. The auxiliary information relates to situations differing from the situations stored in the memory 5. An example of such a different situation may be, for example, a road closed to traffic due to an accident or works, or a newly opened road. Another example is the situation in which there is a tailback on a specific road.

Although it is possible to arrange the traffic navigation system in such a way that a sub-station 3 announces its point of departure and its destination to the main station 1 and that the main station 1 on the basis of this information transmits to this sub-station 3 only the auxiliary information relevant to that sub-station 3, this is not desired in practice. The major reason for this is the protection of privacy of the users of the traffic navigation system, that is to say, the drivers of the vehicles 2. Therefore, said auxiliary information is transmitted as information available to any user. For receiving the auxiliary information each sub-station 3 has an antenna 20 and an interface 21 for transferring the received information to the navigation computer 4. In the navigation computer 4 of the vehicle 2 it is then determined which auxiliary information relates to the route to be followed by that vehicle 2 and, possibly, the route to be followed is adapted to the current situation.

A limiting factor of the reliability of such a traffic navigation system is the speed with which such auxiliary information is adapted to changing current situation. For example, when there is an accident it is important that the auxiliary information is adapted immediately, on the one hand, for the other road users to avoid delay and, on the other hand, generally for avoiding tailbacks being formed on the road, so that emergency services can reach the place of the accident very fast.

For improving the reliability of the described prior-art traffic navigation system, according to an important aspect of the present traffic navigation system, each sub-station 3 transmits to the main station 1 information relating to the accessibility of a section just covered by the vehicle 2 concerned. This information about the accessibility of the section generally relates to the average speed with which a specific section can be covered but may also relate, for example, to temperature in connection with the chance of black ice.

Figure 2:
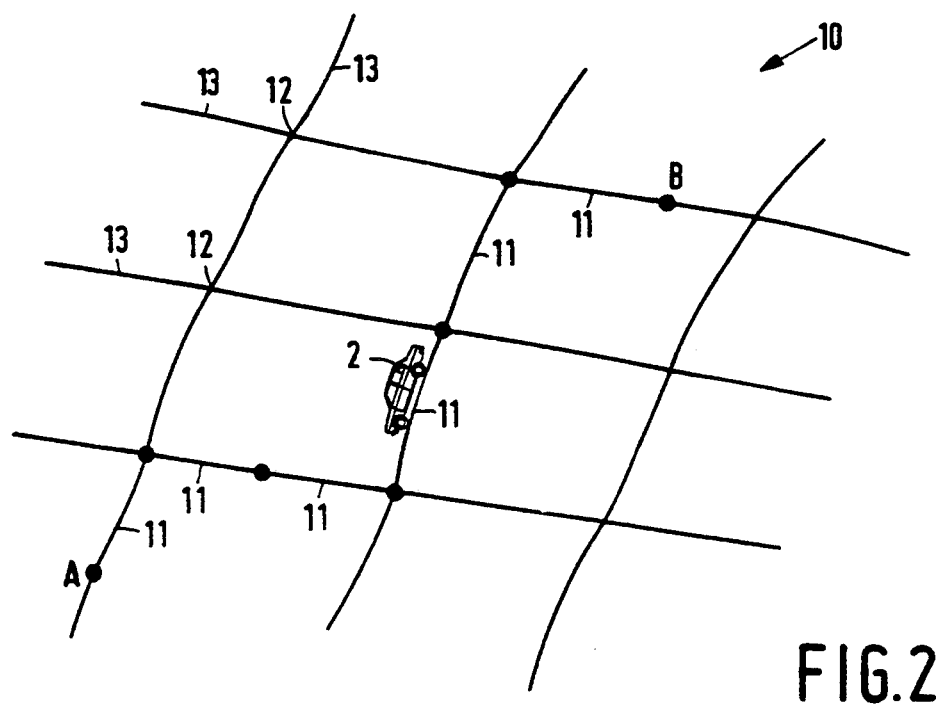
FIG. 2 schematically shows a road system.

FIG. 2 diagrammatically shows a part of a road system 10 on which a vehicle 2 moves from a point of departure A to a destination B. The road system 10 is subdivided into sections 11 in a predetermined manner. The manner in which this subdivision has taken place is not important for a proper understanding of this invention and will therefore not be further described. It should only be observed, however, that this subdivision need not be identical with the subdivision obtained from crossroads 12 of roads 13.

Always when the vehicle 2 leaves a section 11, the navigation computer 4 produces a message containing information relating to the identity of the section 11 concerned and, for example, the average speed and travelling time respectively, the vehicle 2 has reached in the section 11, and this message is sent to the main station 1. Such a message may comprise various data packets which are each to be transmitted in a respective time slot. Again for protection of the privacy of the users of the traffic navigation system the message generally has no information relating to the identity of the sender.

It should be observed that producing and transmitting such messages may also be effected when the driver of the vehicle 2 does not make use of the navigation system as such, that is to say, is not guided by the navigation computer 4 for the selection of his route.

It will be obvious that in practice the relevant section 11 will be driven by a plurality of vehicles 2, so that the main station 1 receives a plurality of independent "measurements" relating to the average speed or travelling time which is apparently feasible in the section 11.

It will also be obvious that a delay in the data packet production and data packet transmission of the order of several seconds or even minutes is acceptable. Although such a delay is to be considered relatively long in communication technology, and unacceptable for example for relaying telephone conversations, a time scale of several seconds may be considered "direct" for passing on traffic information.

The nature of the contents of the message even permits the total loss of several messages: for this matter, the main station 1 receives a plurality of messages relating to the same section 11, whereas the contents of such a message, though extremely useful, are only to be considered auxiliary information.

For the sake of completeness it should be observed that a data packet may also contain information of a different type. For example, a taxi or a goods transport vehicle may send information relating to its location to the main station 1, in which case the main station 1 acts as a relay station for sending this information to a central station of the relevant taxi or haulage business. A vehicle 2 may also transmit an emergency message, for example, if this vehicle 2 is involved in an accident.

Figure 3:
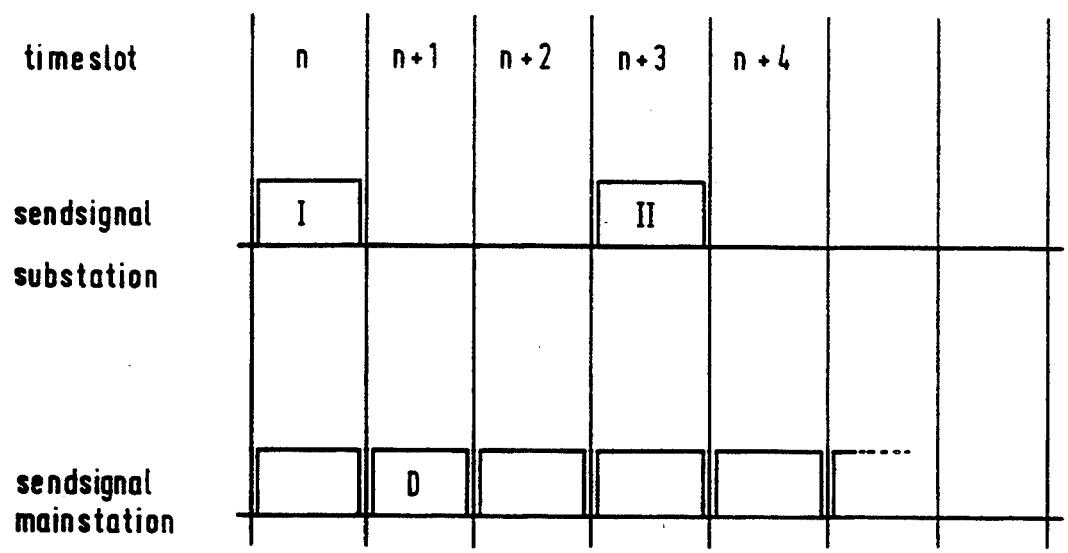
FIG. 3 shows a time diagram of an uplink signal and a downlink signal.

FIG. 3 shows a time diagram of the transmission of a message by a sub-station 3 while an embodiment of a data transmission protocol according to the invention is utilized.

In a specific time slot n the sub-station 3 sends the first data packet I of the message to the main station 1 (uplink). Although the invention is also applicable to the case where the main station 1 acts as a relay station for the data packets, such as, for example in satellite communication, the data packet I received by the main station 1 in above example of a navigation system is not relayed, but processed by the main station 1 itself. In that case the main station 1 is arranged for detecting whether the received data packet I is received correctly or in a disturbed manner, an example of the disturbed reception being given in the case where two sub-stations transmit a data packet in the same time slot. For detecting whether the reception is correct or disturbed, each data packet may comprise check bits.

By way of illustration there will now be a brief description of such a detection. If the main station 1 does not detect any signal strength of the uplink carrier frequency in a specific time slot, the main station deduces that none of the sub-stations has transmitted a data packet in this time slot. If the main station 1 does detect signal strength of the uplink carrier frequency in a specific time slot, the main station 1 performs a check procedure with the aid of the check bits. Depending on the result of this check procedure the main station deduces whether the data packet has been received correctly or not.

In the time slot n+1, subsequent to the time slot n, the main station 1 transmits a data packet D intended for all the active sub-stations 3 (downlink), in which data packet D at least a single data bit is indicative of the receive condition of the data packet I received in the time slot n. On the basis of the value of this receive condition bit said sub-station 3 decides whether a next data packet H to be transmitted is to be again the data packet I transmitted in the time slot n, when the receive condition bit received in the time slot n+1 is indicative of a disturbed reception, or whether the next data packet II to be transmitted may be a second data packet.

It should be observed that the manner in which the data bits of the data packets are coded is not relevant to a proper understanding of the present invention, so that a further description of this coding will be omitted here.

Neither is it important for a proper implementation of the method according to the present invention how many data bits a data packet contains and what position the receive condition bit has in the data packets to be transmitted by the main station 1. By way of example, each data packet D to be transmitted by the main station 1 first comprises a predetermined number of alternating synchronizing (sync) bits and the next bit is the receive condition bit while, also by way of example, the value "0" for the receive condition bit may be indicative of a disturbed reception and the value "1" for the receive condition bit is indicative of a correct reception.

With effect from the time slot n+2 the sub-station 3 can transmit the next data packet II. In each time slot the transmission probability p has a predetermined value, while the probability of non-transmission is equal to 1−p. Therefore, the "number" of the actual time slot in which the sub-station 3 transmits the next data packet II, time slot n+3 in the example illustrated in FIG. 3, is not known in advance and the time distance between two consecutive time slots in which the sub-station 3 transmits a data packet will constantly change. In this connection it should only be observed that the probability of the next data packet still not being transmitted in time slot n+1+x is equal to $(p^x)$ for $x \geq 1$.

After the transmission of the second data packet the above-described cycle again takes place until the last data packet of said message has been transmitted (and received correctly).

With the method described above there is an advantage that no transmission time in the downlink needs to be spent on repeating the received data packets, whereas yet a "reception acknowledgement" can be transmitted to each receiver. It should be considered that such a "reception acknowledgement" will only mean something to the sub-station that has transmitted a data packet during the preceding time slot.

A further improvement is obtained if a receive condition bit is also used for reserving a next time slot for the relevant sub-station. As already observed hereinbefore, the "reception acknowledgement" is only of importance to a sub-station that transmitted a data packet during a preceding time slot and the reserved time slot will only be reserved for said sub-station. In an embodiment a receive condition bit indicative of a correct reception and transmitted in time slot n+1 implies a reservation of the time slot n+2 for the relevant sub-station. Starting from the time slot n+2 the sub-station can constantly transmit in the time slots n+2, n+4, n+6 etc., a receive condition bit being transmitted by the main station in the time slots n+3, n+5 and n+7 etc. Since all the other stations receive the receive condition bit in the time slots n+1, n+3, n+5, n+7 etc. and, if this is indicative of a correct reception, understand that the time slots n+2, n+4, n+6 etc. have been reserved for another sub-station (without knowing which sub-station), they will not transmit in the time slots n+2, n+4, n+6 etc., so that the data packet of the sub-station that is really transmitting does not run the risk of colliding with other data packets. Consequently, the efficiency of the uplink is improved, so that the probability of incorrect reception is reduced.

When said sub-station has finished transmitting data packets, it may simply stop transmitting. The main station then receives no signal in the relevant time slot n and reacts to the suspended reception by transmitting a receive condition bit indicative of a disturbed reception, so that the time slot n+2 becomes available for use to any sub-station.

Figure 4:
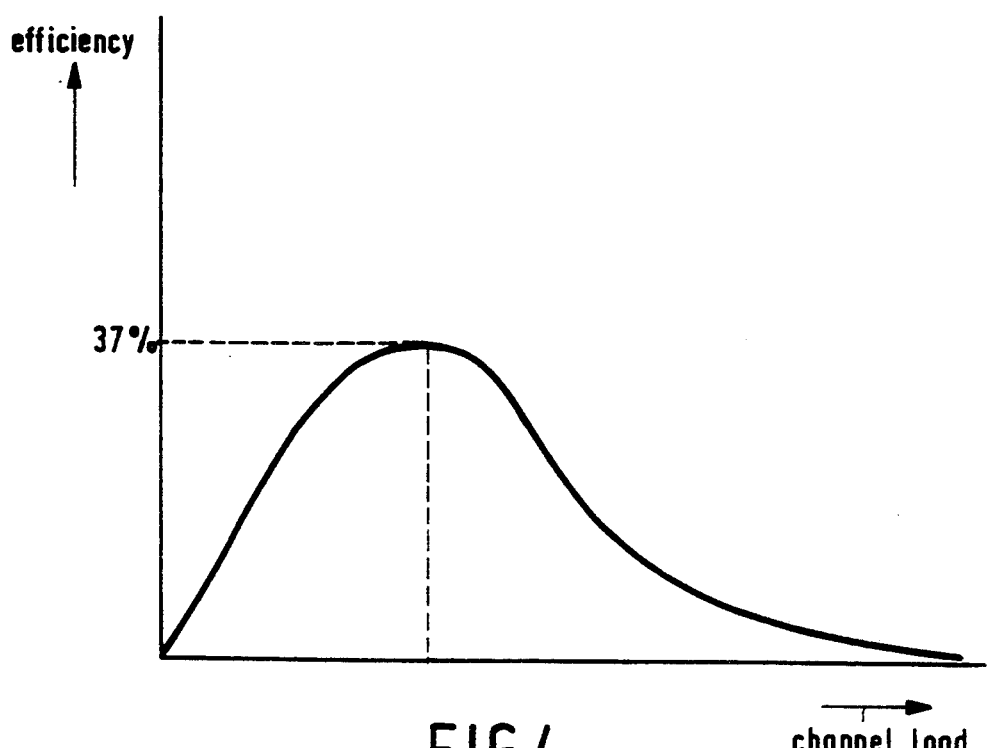
FIG. 4 shows a curve representing the relationship between the instantaneous throughput and the instantaneous transmission load of a communication signal when the prior-art method is used.

It will be evident that the instantaneous load of the uplink communication channel is proportional to p and to the number of sub-stations that attempt to transmit a message. As is known, the instantaneous throughput of the uplink communication channel depends on its instantaneous load as shown by the curve of FIG. 4 (cf. FIG. 6.3 of said publication). A measure for the instantaneous throughput is provided by the average number of data packets correctly received per time unit divided by the maximum number of data packets that can be transmitted over the relevant uplink communication channel during that time unit. Since the latter number for the communication channel concerned is a constant value, said division may be omitted.

On the basis of the instantaneous throughput, as is represented by the average number of data packets received correctly per unit of time, in each substation the probability p is adapted according to the invention so as to obtain an optimum load of the relevant communication channel, that is to say, a load for which the instantaneous throughput is, though approximately, equal to the maximum attainable throughput of about 37%.

Such an adaptation may be carried out by each sub-station when the main station transmits to all the active sub-stations a predetermined number of bits, preferably two, in predetermined time slots, for example in each time slot, for controlling the adjustment of the probability p in each sub-station. In addition, in a simple case the contents of the probability adjustment bits may be indicative of either the command "do not change" or the command "increase", or the command "reduce", while the instantaneous value of the probability p is increased or reduced respectively, by a predetermined value when an "increase" command or a "reduce" command is received.

It is impossible, however, to ensure that all the active sub-stations transmit with the same probability p, which is deemed desirable from a "democratic" point of view.

Therefore, preferably the probability adjustment bits transmitted by the main station are indicative of an absolute value of the probability p, each sub-station automatically adjusting the instantaneous value of the probability p to said absolute value when a probability adjustment command represented by the probability adjustment bits is received.

It should be observed that it may be desirable to use a relatively large number of probability adjustment bits to make a rather accurate adjustment of the probability p over a relatively large range of values possible. It is true, all the probability adjustment bits may be transmitted again in each time slot, so that in each time slot an adjustment of the transmit probability of the sub-stations 3 is possible, but this will restrict the number of free information bits that may be transmitted by the main station in each rime slot. According to an aspect of the invention, however, it is likewise possible to spread out the successive probability adjustment bits over a plurality of time slots, it even being possible that in each time slot not more than a single one of the probability adjustment bits is transmitted. This does restrict the "frequency" with which probability adjustment is possible, but it will not be unacceptable in practice.

An example of a protocol for transmitting probability adjustment commands will now be discussed with reference to FIG. 5.

FIG. 5A shows, as does FIG. 3, the send signal of the main station in a plurality of successive time slots.

FIG. 5B more specifically shows the structure of a data packet transmitted in a single time slot: a predetermined number of message bits B preceded by a predetermined number of sync bits A and followed by a predetermined number of check bits C. Although FIG. 3 represents the send signals belonging to the different rime slots as separate blocks for clarity, which suggests that they are separated by a "signal gap", a continuous send signal may be transmitted in practice while the actual separation in time slots is realised by the sync bits A. The manner in which the values of the separate bits are coded by the carrier is unimportant for a proper understanding of the invention and will be known per se to an expert, so that this will not be discussed any further.

Figure 5:
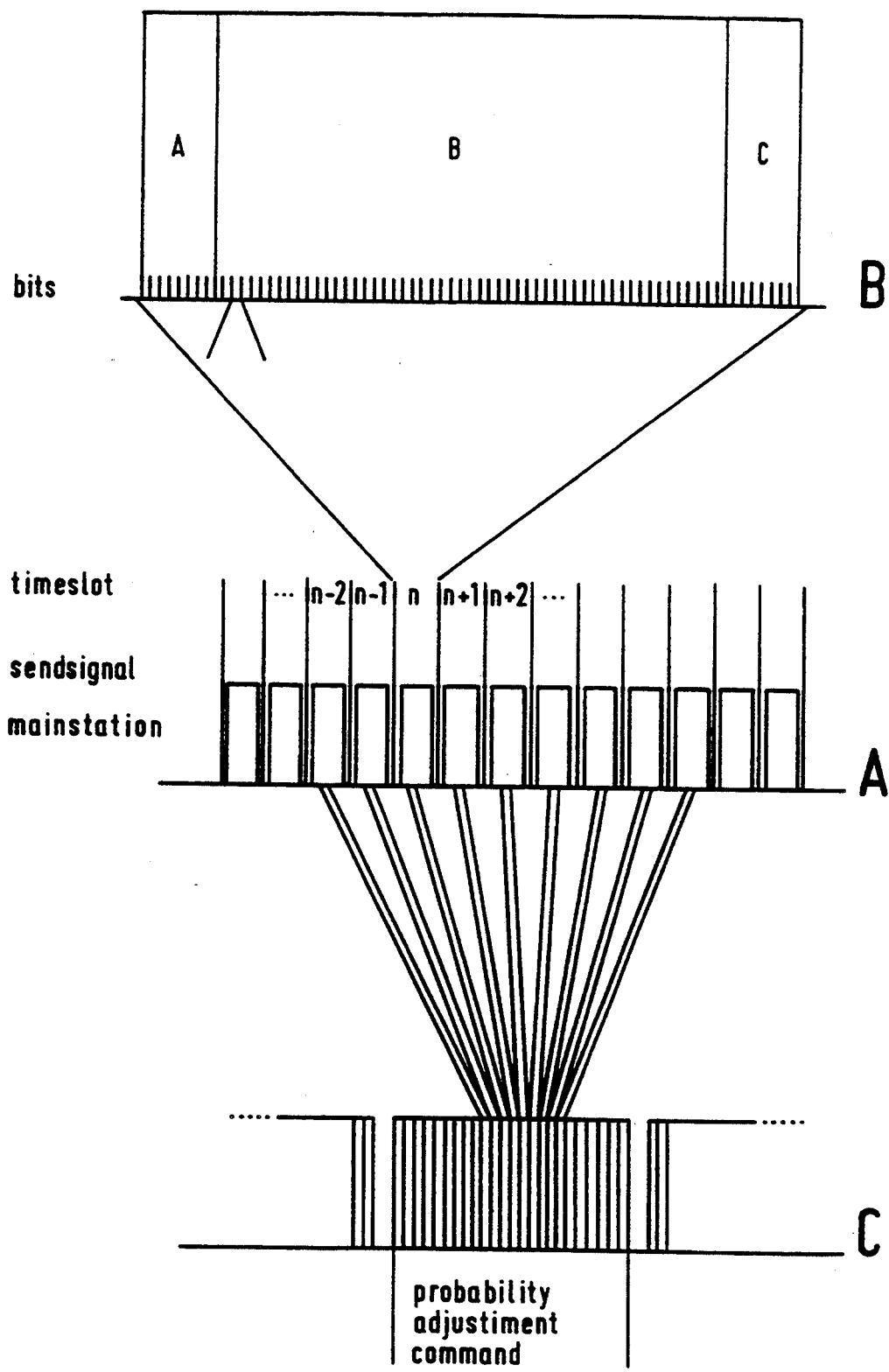
FIGS. 5A-C show examples of the way in which the separate bits of a probability adjustment command may be distributed over various time slots.

In the example illustrated in FIG. 5 the third message bit is a probability adjustment bit. FIG. 5C shows that the combination of a predetermined number of probability adjustment bits associated to consecutive time slots defines a probability adjustment command. Such a probability adjustment command may have a structure of a predetermined number of header bits followed by a predetermined number of probability bits, which may be followed by a predetermined number of check bits. The probability bits may be a direct binary encoded representation of the absolute value of the probability p. If the number of probability bits is equal to 10, the probability p may be set between 0 and 0.1024 with a resolution of 0.0001. The probability bits, however, may also refer to a Table of values for the probability p, which Table is present in the memory of each sub-station. If the number of probability bits is equal to 10, this Table may comprise 1024 preselected possible absolute values of the probability p, while the differences between consecutive possible absolute values of the probability p need not be equal.

To provide a good distinction between the header bits and the probability bits, and to ensure that not a single combination of a number of header bits with a number of subsequent probability bits or a combination of a number of probability bits with a number of subsequent header bits may erroneously be interpreted as the header, the number of header bits is preferred to be greater than the number of probability bits. For example, when the number of above probability bits is equal to 10, the number of header bits is equal to 15 and the header has the value of 001010101010100.

During a sampling time interval the main station 1 investigates for each time slot in that time interval which of the following situations occurs in a specific time interval:

1) the time slot is empty, that is to say, none of the sub-stations has transmitted a data packet;
2) a data packet has been received correctly in the time slot;
3) a data packet has not been received correctly in the time slot, which is most probably caused by a "collision" between at least two concurrently transmitted data packets.

During this operation the main station 1 counts how often said situations 1), 2) and 3) occur in the sampling time interval. It should be observed that ideally a fixed average percentage of time slots will be empty (37%), a fixed percentage of time slots will exhibit correct reception (37%) and a fixed percentage of collisions will occur (26%). When the load on the communication channel is too heavy, the percentage of empty time slots will be smaller than 37% and the percentage of collisions will be greater than 26%, whereas in the case of a smaller throughput than 37% as a result of the communication channel being used too little, the percentage of empty time slots will be greater than 37% and the percentage of collisions will be smaller than 26%. By comparing the measured percentages with the ideal percentages, the main station 1 determines whether the load of the communication channel differs from the ideal load and to what extent, and on the basis thereof the main station 1 decides whether the probability p is to be changed and to what extent.

It should be observed that the messages to be transmitted may be classified in various categories and that the probability p may be different for messages of different categories. For example, in addition to above messages relating to section information (to be termed category I hereinafter), also messages intended for a haulage business and relating to the localization of the vehicle (to be termed category II hereinafter), and emergency messages (to be termed category III hereinafter) may be transmitted. Category III messages have priority over category I and II messages and, for example, have a fixed large send probability p of 1/20.

Category II messages may have priority over category I messages and may also have a higher send probability. In the scope of the invention the probability p(II) for category II messages can be controlled directly from the main station, irrespective of the control of the probability p(I) for category I messages, but in a simple embodiment there is a fixed relationship between the probabilities p(I) and p(II) = 10−p(I), where the probability p(I) is controlled from the main station as described hereinbefore and the probability p(II) is computed in the sub-station concerned. It should be observed that not every sub-station needs to be arranged for transmitting category II messages.

All this implies that there is first determined in the sub-station whether messages in the category III are to be transmitted. If so, these messages are transmitted with the associated channel access probability p(III). If not, there is determined in the sub-station whether messages in the category II are to be transmitted. If so, these messages are transmitted with the associated channel access probability p(II). If there are no messages to be transmitted in the II and III categories, any messages in the category I are transmitted with the associated channel access probability p(I). Therefore, in practice it may occur that a specific message in the category I experiences considerable delay before being transmitted. Although this is no objection as such, as has already been observed hereinbefore, it will be evident that there will no longer be a need for receiving the message concerned after some time. The sub-station may therefore be arranged for deleting from its memory a specific message that has already been waiting for a specific amount of time, for example, five minutes, and not transmitting same. Such a line of thought also relates to the messages of the category II: a haulage business is generally interested in the current location of its vehicles, but not in information about their locations of, for example, an hour previously. "Rejecting" the belated messages thus reduces the load of the communication channel, which load reduction will specifically occur when there are large delays i.e. when there is a large channel load.

It will be evident to the expert that it is possible to change or modify the represented embodiment of the method according to the invention without distracting from the inventive idea or scope of protection of the invention. For example, it is possible for a data packet transmitted by the main station in a specific time slot to be used at least partly for transmitting a complete probability adjustment command.

I claim:

1. Method of transmitting data from a plurality of sub-stations to a main station by way of a common communication channel which is subdivided into time slots having a length and times of occurrence determined by a corresponding time slot distribution of a data transmission signal transmitted by the main station, each substation having its own predetermined probability p between 0 and 1 governing the sub-station's right to attempt to transmit a data packet in the time slots, comprising: monitoring in the main station a load of the communication channel and comparing this load with an optimum load and, on the basis of the result of this comparison, transmitting control instruction to the sub-station for modifying said sub-station's probability p in response to the load of the communication channel, and in each sub-station modifying the sub-station's predetermined probability p in response to receiving said control instructions.

2. Method as claimed in claim 1, characterized in that the main station detects in each time slot whether a data packet has been received or not in the relevant time slot, and if so, whether the data packet received in the relevant time slot has been received correctly or not; in that the main station for a predetermined length of time counts the number of time slots in which no data packet, a correct data packet or an incorrect data packet has been received respectively or calculates the respective percentages; in that the main station compares the counting results or percentages with the respective counting results or percentages as they would occur in the situation of an optimum load of the communication channel; and in that the main station sends out said control instructions on the basis of the result of this comparison.

3. Method as claimed in claim 2, characterized in that said control instructions cause each sub-station to increase the instantaneous value of its probability if the counting result or the percentage relating to the number of time slots in which no data packet has been received exceeds at least to a predetermined extent the relevant counting result or percentage in the optimum situation and/or if the counting result or the percentage relating to the number of time slots in which an incorrect data packet has been received is smaller at least to a predetermined extent than the relevant counting result or percentage in the optimum situation; and in that said control instructions cause each sub-station to reduce the instantaneous value of its probability p if the counting result or the percentage relating to the number of time slots in which no data packet has been received is smaller at least to a predetermined extent than the relevant counting result or percentage in the optimum situation and/or if the counting result or the percentage relating to the number of time slots in which an incorrect data packet has been received exceeds at least to a predetermined extent the relevant counting result or percentage in the optimum situation.

4. Method as claimed in claim 1, characterized in that the main station transmits a predetermined number of probability adjustment bits in predetermined time slots so as to control the adjustment of the probability p in each sub-station.

5. Method as claimed in claim 4, characterized in that no more than one bit in each time slot operates as a probability adjustment bit.

6. Method as claimed in claim 4, characterized in that the contents of the probability adjustment bits are indicative of an absolute value of the probability p.

7. Method as claimed in claim 4, characterized in that a memory is associated with each sub-station, which memory stores a table of possible values of the probability p, and in that the contents of the probability adjustment bits are indicative of a position in said table of the probability p value to be adjusted.

8. Communication system comprising: a main station and a plurality of sub-stations arranged for communicating with each other by way of a common communication channel which is subdivided into time slots having a length and times of occurrences determined by a time slot distribution of a data transmission signal transmitted by the main station, each sub-station having its own predetermined probability p governing its right to transmit a data packet in the time slots, wherein the main station comprises means for monitoring a load of the communication channel and for comparing this load with an optimum load, and on the basis of the result of the comparison, for transmitting control instructions to the sub-stations for modifying said sub-station's probability p in response to the load of the communication channel and wherein each sub-station comprises means for receiving said control instructions and for modifying its probability p in response to the control instructions received.

9. Traffic navigation mobile apparatus comprising: a sub-station adapted to communicate with a main station by way of a communication channel which is subdivided into time slots having a length and times of occurrence determined by a time slot distribution of a data transmission signal transmitted by the main station, said sub-station having its own predetermined probability p between 0 and 1 governing its right to transmit a data packet within a time slot, said sub-station having means for receiving control instructions from said main station including a probability adjustment command, and means for modifying its probability p in accordance with the probability adjustment command of the received control instructions.

* * * * *